(12) United States Patent
Shellhammer et al.

(10) Patent No.: US 10,250,514 B2
(45) Date of Patent: Apr. 2, 2019

(54) SYSTEMS, METHODS, AND DEVICES FOR ADDRESSED DATA COMMUNICATIONS

(71) Applicant: Chris Culligan, Waterloo (CA)

(72) Inventors: Brett Shellhammer, Waterloo (CA); Chris Culligan, Waterloo (CA)

(73) Assignee: QUIET COACH INC., Waterloo (CA)

( * ) Notice: Subject to any disclaimer, the term of this patent is extended or adjusted under 35 U.S.C. 154(b) by 0 days.

(21) Appl. No.: 15/117,013

(22) PCT Filed: Feb. 6, 2015

(86) PCT No.: PCT/CA2015/000067
§ 371 (c)(1),
(2) Date: Aug. 5, 2016

(87) PCT Pub. No.: WO2015/117228
PCT Pub. Date: Aug. 13, 2015

(65) Prior Publication Data
US 2017/0171093 A1 Jun. 15, 2017

Related U.S. Application Data

(60) Provisional application No. 61/936,517, filed on Feb. 6, 2014.

(51) Int. Cl.
*H04L 12/823* (2013.01)
*H04L 29/06* (2006.01)
(Continued)

(52) U.S. Cl.
CPC .......... *H04L 47/32* (2013.01); *H04L 61/2038* (2013.01); *H04L 61/2069* (2013.01);
(Continued)

(58) Field of Classification Search
None
See application file for complete search history.

(56) References Cited

U.S. PATENT DOCUMENTS 7,164,766 B2 1/2007 Schwenk
7,746,781 B1 * 6/2010 Xiang ................. H04L 47/2408
370/235
(Continued)

FOREIGN PATENT DOCUMENTS

WO 2009064165 5/2009

OTHER PUBLICATIONS

Boivie, R. et al., "Small Group Multicast: A New Solution for Multicasting on the Internet", IEEE Internet Computing, vol. 4, issue 3, pp. 75-79, May-Jun. 2000.

*Primary Examiner* — Kodzovi Acolatse
(74) *Attorney, Agent, or Firm* — Bereskin & Parr LLP/S.E.N.C.R.L., s.r.l.

(57) ABSTRACT

According to one aspect, a communications system for sending a data packet, including a first device, comprising a processor, the processor configured to compose an addressing bitmask and, address the data packet with the bitmask; and, a transmitter connected to the processor for transmitting the addressed data packet; and a second device, comprising a receiver for receiving the addressed data packet; and a processor attached to the receiver, the processor configured to perform a bitmask test on the bitmask contained in the addressed data packet such that, if the test is failed, then the addressed data packet is discarded.

8 Claims, 16 Drawing Sheets

(51) Int. Cl.
*H04L 29/08* (2006.01)
*H04L 29/12* (2006.01)
(52) U.S. Cl.
CPC ........ *H04L 65/4076* (2013.01); *H04L 65/607* (2013.01); *H04L 65/608* (2013.01); *H04L 69/16* (2013.01); *H04L 69/326* (2013.01); *H04L 61/6095* (2013.01)

(56) References Cited

U.S. PATENT DOCUMENTS

| | | | |
|---|---|---|---|
| 2002/0146074 A1* | 10/2002 | Ariel | H03M 13/27 |
| | | | 375/240.27 |
| 2007/0076739 A1 | 4/2007 | Majeshwar et al. | |
| 2009/0165074 A1 | 6/2009 | Elstermann et al. | |
| 2010/0232438 A1* | 9/2010 | Bajpai | H04L 69/16 |
| | | | 370/400 |
| 2010/0278533 A1 | 11/2010 | Julien et al. | |
| 2012/0147936 A1* | 6/2012 | Rangan | H04L 1/1877 |
| | | | 375/222 |
| 2012/0224491 A1* | 9/2012 | Norair | H04L 1/0061 |
| | | | 370/242 |
| 2013/0219482 A1 | 8/2013 | Brandt | |
| 2014/0201798 A1* | 7/2014 | Kazui | H04N 21/23614 |
| | | | 725/116 |
| 2015/0092652 A1* | 4/2015 | Ramamurthy | H04W 72/005 |
| | | | 370/312 |

\* cited by examiner

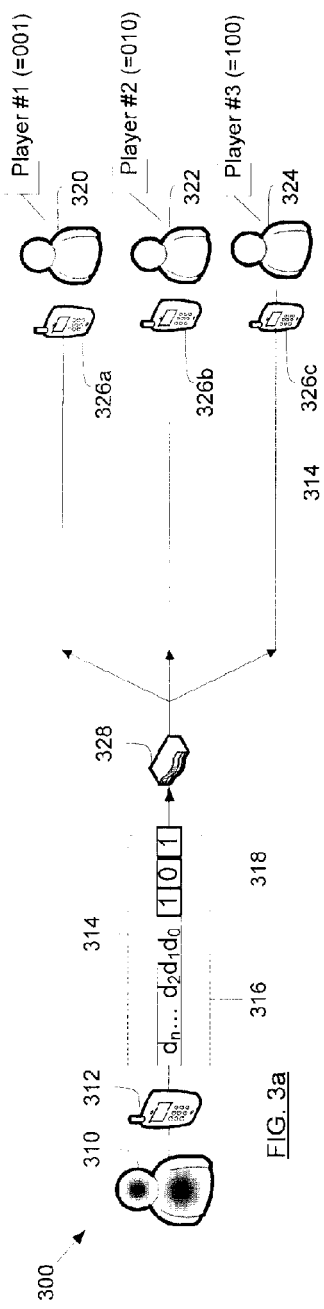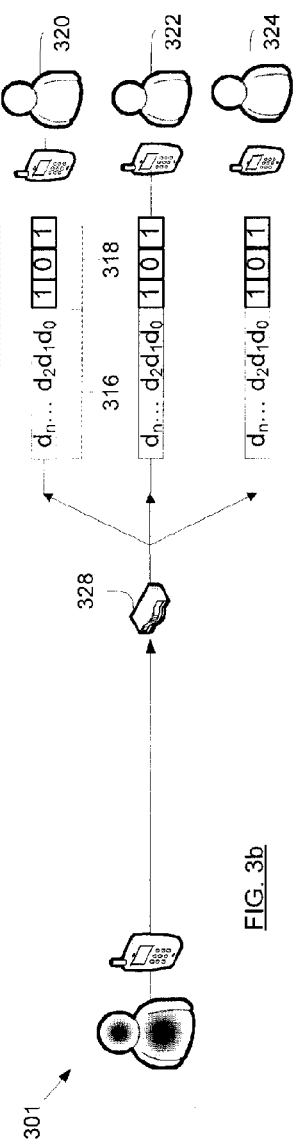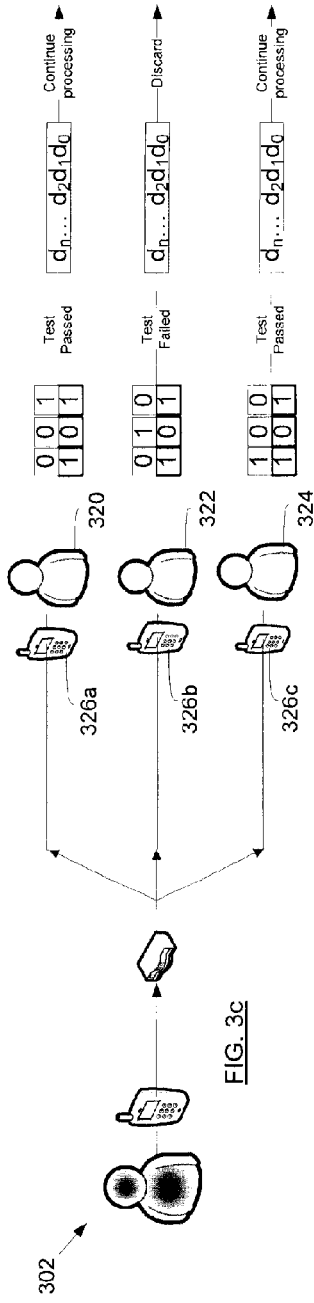
FIG. 3a
FIG. 3b
FIG. 3c

SYSTEMS, METHODS, AND DEVICES FOR ADDRESSED DATA COMMUNICATIONS

TECHNICAL FIELD

The embodiments disclosed herein relate to data communications, and, in particular, to systems, methods, and devices for providing one-way streaming communications between one or more transmitting devices and one or more receiving devices.

BRIEF DESCRIPTION OF THE DRAWINGS

The drawings included herewith are for illustrating various examples of systems, methods, and devices of the present specification. In the drawings:

FIG. 3a depicts an example of a communications transaction at a first instant or point in time;

FIG. 3b depicts an example of a communications transaction at a second instant or point in time;

FIG. 3c depicts an example of a communications transaction at a third instant or point in time;

DETAILED DESCRIPTION OF SOME EMBODIMENTS

Figure 1:
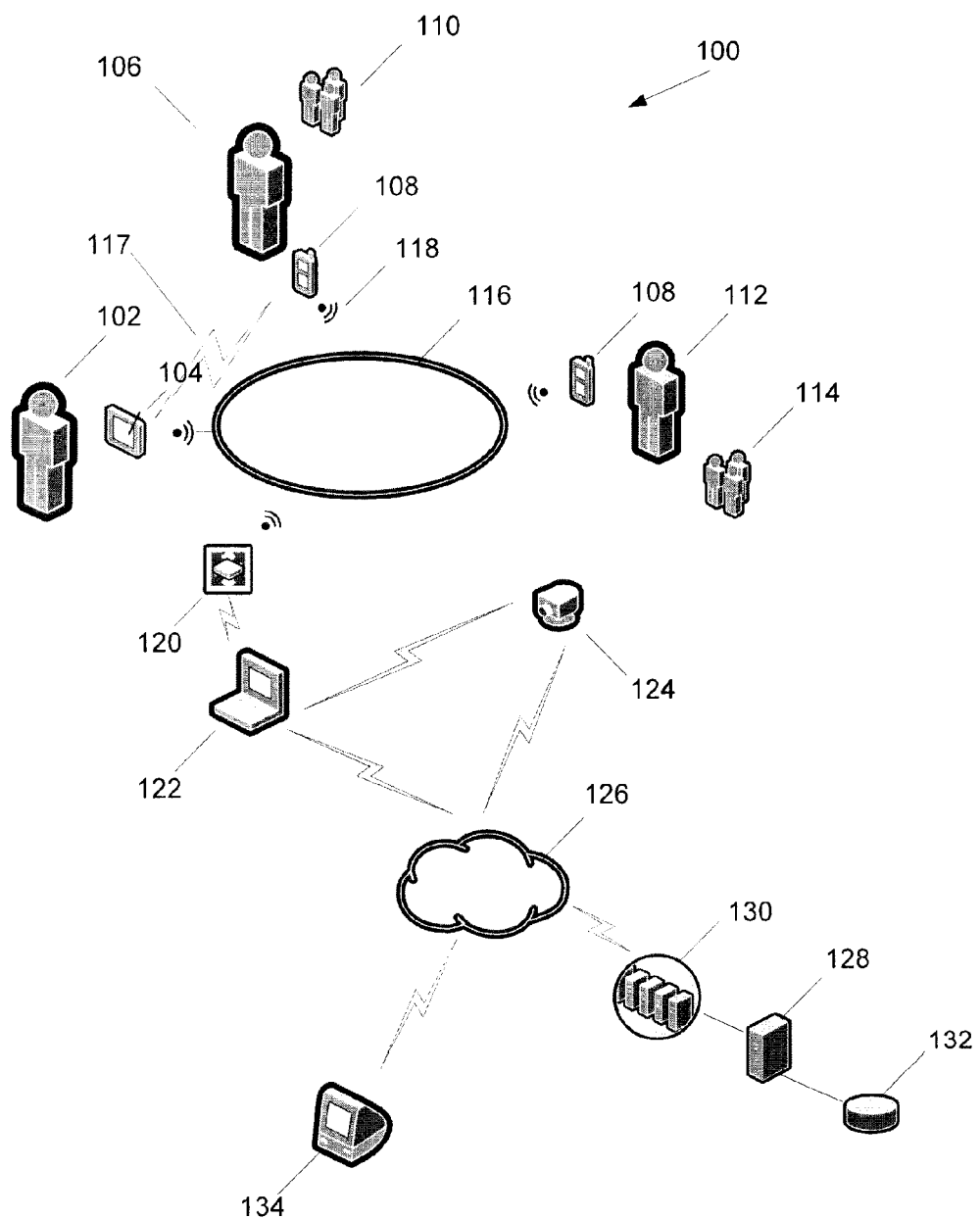
FIG. 1 is a diagram of a communications network for sending data packets according to one embodiment.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems, methods, and devices described herein may be implemented in hardware or software, or a combination of both.

In some cases, embodiments may be implemented in one or more computer programs executing on one or more programmable computing devices including at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems, methods, and devices as described herein may be implemented as a non-transitory computer-readable storage medium configured with a computer program, wherein the storage medium so configured causes a computer to operate in a specific and predefined manner to perform at least some of the functions as described herein.

Turning now to FIG. 1, illustrated therein is a communications system 100 for sending data packets. The system 100 may be used by a first user 102 equipped with a transmitting or first device 104, and a second user 106 equipped with a receiving or second device 108.

The second user 106 may be a member of a group of second users 110. For example, the group of second users 110 may be a sports team. In such a case, the second user 106 may be a player on the team, and the first user 102 may be the coach of the team.

A third user 112, equipped with a receiving or second device 108 may be a member of a group of third users 114. In the example of a sports team, the third user 112 may be a parent, a member of the coaching staff, a talent scout, or another observer.

The first device 104 and second device 108, along with other devices, may be connected to a private local area network 116. For example, devices may connect to the private local area network 116 using a wireless link such as wireless connection 118. The private local area network 116 may be supported by a router 120 or other suitable communications equipment.

According to some embodiments, a radio-frequency (RF) channel 117 may be used to provide direct communications between two or more of the devices 104 and 108. For example, a broadcast channel can be established using frequencies in unlicensed bands, such as 300 MHz, 900 MHz, 2.4 GHz, etc.

Communications that use the RF channel 117 generally do not require the use of the private local area network 116, the router 120, etc. In other cases, communications may use a combination of both the RF channel 117 and the private local area network 116.

As used herein, for the sake of clarity, "direct RF broadcast" is intended to refer to embodiments that do not require the use of a private local area network, or that use an RF channel such as RF channel 117 for direct communications. While it can be said that all wireless communications are radio-frequency communications, a distinction is made herein between those that use a direct or broadcast RF signal between a first user device and a second user device, and those that require the use of higher-level communications protocols and/or networking equipment such as routers.

In use, the system 100 may allow the first user 102 to send real-time or substantially real-time one-way communications to at least one second user 106 over the private local area network 116. For example, the coach of a sports team may wish to address a single player on the team, or a sub-group of players, or the entire group of players, in order to provide coaching instruction.

For example, the first user 102 may wear a headset (not shown), or other device containing a microphone, that is connected to the first device 104. The second user may wear an earpiece (not shown), or other device containing a speaker, that is connected to the second device 108.

In use, the first user 102 may select a particular second user 106 from among the group of second users 110 to receive a message or instruction. The first user 102 may then speak into the headset or microphone connected to the first device 104. According to some embodiments, the sound captured by the microphone may be encoded, packetized, addressed, and transmitted over the private local area network 116, and received by the second device 108.

When the second device 108 receives the data communication, then the second device 108 may process the received addressed data packet such that the original message or instruction may be recovered and outputted via an earpiece or speaker.

A third user 112 may be equipped with a device (i.e., a second device 108 or another compatible device) in order to monitor the communications from the first user 102 to the second user 106. For example, the third user 112 may be the parent of the second user 106; and the parent may wish to monitor instructions sent from the first user 102, such as a coach, to their child.

In some cases, the system 100 may include a base station 122. The base station 122 may be a computer, such as a portable computer, or personal computer, or other suitable equipment. The base station 122 may be connected to the private local area network 116 through the router 120. The base station 122 may be used to manage the private local area network 116, and in some cases may be used to set up and configure the first devices 104 and second devices 108.

In some specific examples, the base station 122 may be connected to the Internet 126, and this connection could be intermittent or permanent. According to some embodiments, the connection to the Internet 126 may facilitate access to a server 128, a cloud-based platform 130, and a database 132, and/or other Internet resources. In some cases, a home computer 134 may also be connected to the Internet 126.

According to some embodiments, in use, a first user 102 may use a first device 104 to provide communications such as voice messages and instructions, to at least one second user 106, who is equipped with a second device 108. These communications may be stored on the base station 122. Furthermore, the base station 122 may periodically or continuously transfer the stored communications to and from Internet resources such as the server 128, the cloud-based platform 130, and the database 132.

For example, stored communications may be retrieved from the base station 122, the server 128, the cloud-based platform 130, and/or the database 132 via the Internet 126. The stored communications may be retrieved by the base station 122, a home computer 134, or another device connected to the Internet.

The stored communications may be retrieved so that the communications can be reviewed, edited, or otherwise processed. For example, during a sports team practice session, a first user 102, such as a coach, may have multiple communications threads with multiple individual second users 106, such as players.

At some time after the practice session, it may be possible to edit and process the stored communications so that a single thread of communications, for example, pertaining to a particular player, can be compiled. In this way, a player, coach, or observer may review all of the instructions received by a player from a coach in a single communications thread.

In some embodiments, the system 100 may include a video camera 124. For example, if the system 100 is used by a sports team, such as during a practice session or during a game, then the video camera 124 may be used to record video images of the sports team of individual players.

The video camera 124 might be a stand-alone video camera. According to some embodiments, the video camera 124 may be connected to the base station 122, or directly to the Internet 126. The video images recorded by the video camera 124 may be stored on the video camera 124, or the video images may be recorded and/or stored on the base station 122. In various embodiments, the video images recorded by the video camera 124 may be stored on a server 128, a cloud-based platform 130, or a database 132 on the Internet 126.

The video images captured by the video camera 124 may be recovered, edited, compiled, or otherwise processed by the base station 122, or by another computer such as home computer 134, which is connected to the Internet 126. For example, by using timing information, the stored communications, such as voice messages and instructions, may be added to and/or synchronized with the video images captured by the video camera 124.

In some cases, the video and audio information could be provided to one or more users as part of a service, such as a service where a user could login and review the videos. For example, parents who may want to better monitor their child's activities may elect to subscribe to a paid service that allows them to review the videos.

According to some embodiments, the system 100 may be enabled by selecting and modifying appropriate communications protocols and addressing schemes for use on the private local area network 116.

Figure 2A:
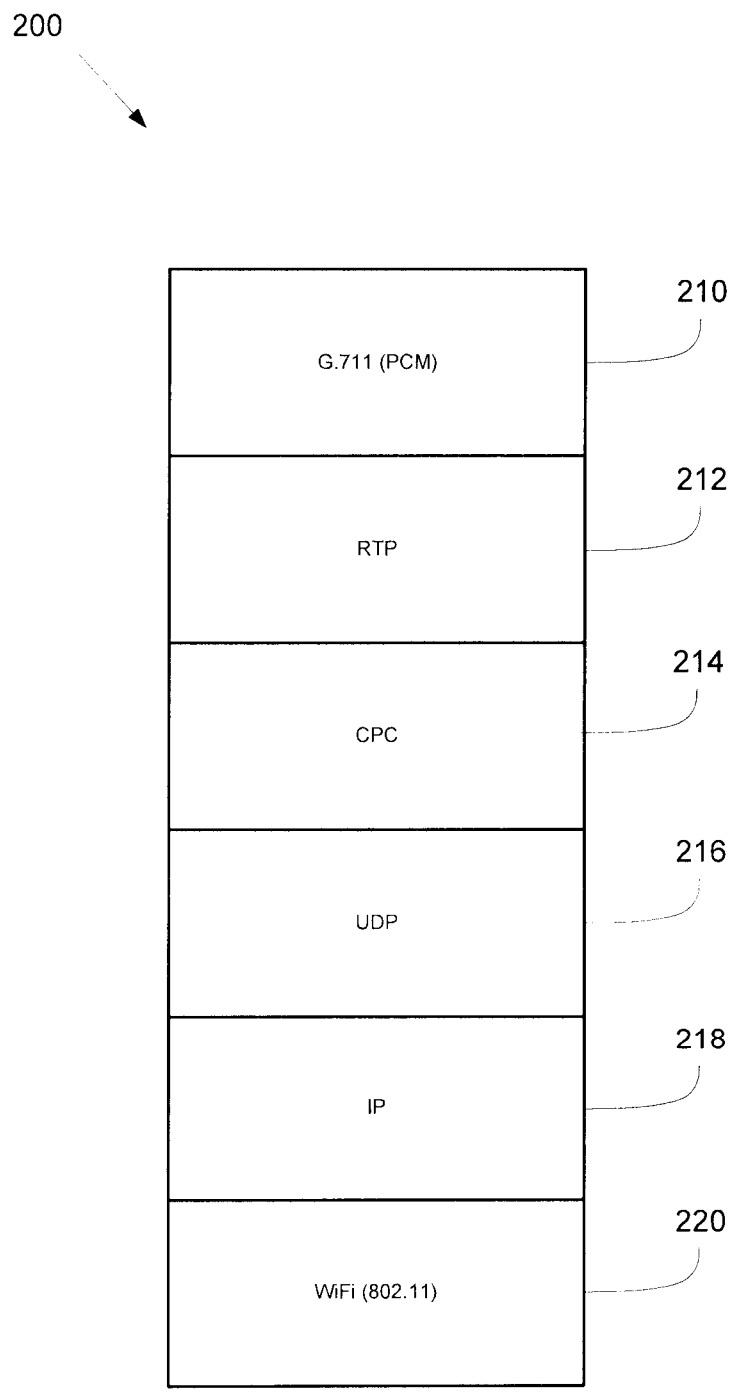
FIG. 2a is a diagram of a network protocol stack that may be used on a communications network according to some embodiments.

Referring now to FIG. 2a, illustrated therein is a communications protocol stack 200 according to some embodiments. The communications protocol stack of FIG. 2a is shown as an example that uses certain standardized protocols for the sake of illustration. Other protocols may be substituted using standardized or proprietary schemes.

Layer 210 represents an audio encoding layer. This audio encoding layer may be used to encode an audio signal, such as an audio signal pertaining to voice. In some systems, methods, and devices, the audio signal may be received from an audio device (not shown) that is connected to the first device, such as a sound card and/or microphone.

According to some embodiments, audio data can be encoded using the ITU G.711 standard, or pulse-code modulation (PCM). For example, the ITU G.711 standard may be implemented using a μ-law variant. The use of ITU G.711 may provide encoding with a resulting audio stream of 64 kbit/s, which may mean that audio compression can be avoided, thus keeping the systems, methods, and devices relatively computationally simple (i.e., no compression and decompression are required).

Layer 212 represents an application layer protocol. Layer 212 may define a packet format, such as a standardized packet format. This packet format may be used to packetize the encoded sound from layer 210.

According to some embodiments, the encoded sound can be packetized using the Real-time Transport Protocol (RTP). For data transmission over RTP, the encoded audio may need to be split into discrete packets. For smooth play-out of the audio data in the presence of network latency variations (known as "jitter"), a play-out buffer at the receiver, or second device, may be used.

Layer 214 generally represents a Coach-Player-Communications protocol (CPC). The Coach-Player-Communications protocol may be used to facilitate efficient group communications along with a multi-casting or broadcasting protocol.

According to some embodiments, the Coach-Player-Communications protocol may require that an addressing bitmask be composed for use with the data packet from layer 212. More particularly, the Coach-Player-Communications protocol may be an open-loop, flexible addressing scheme that enumerates arbitrary subsets of a fixed number of receivers by using a bitmask to identify the intended recipients for each packet.

For example, to enumerate 32 receivers, each receiver may be assigned an increasing power-of-two identification number: 1, 2, 4, 8, 16, etc. In such a case, the packets might carry a 32-bit filter number that represents the binary OR over those identification numbers corresponding to the receivers that are intended to receiver the packet. As an ancillary consequence of the scheme in this example, filter number 0 would represent the (nonsensical) empty set. As such, filter number 0 could be used, for example, to transmit control information or other information to all participants.

In general, the Coach-Player-Communications protocol may be implemented as a shim layer between layer 212 and layer 216. On the sender side, the Coach-Player-Communications protocol filter number may be added after constructing the layer 212 packet and before passing it to the layer 216 packet. On the receiver side, the Coach-Player-Communications protocol test (binary AND between the filter number and the receiver identification) may be executed on each received packet, before the packet is passed to the layer 212 for processing. If the Coach-Player-Communications protocol test fails, then the packet may be silently discarded.

Layer 216 represents a transport layer protocol for transmitting the addressed data packet from layer 214. According to some embodiments, the addressed data packets can be processed for transmission by forming the addressed data packets into datagrams, such as according to the User Datagram Protocol (UDP). In other embodiments, the addressed data packets can be processed for transmission according to the Transport Control Protocol (TCP), or another transport layer protocol.

Layer 218 represents a network layer protocol for relaying the datagrams of layer 216. According to some embodiments, the datagrams may be relayed according to the Internet Protocol (IP) protocol. In particular, and according to some embodiments, a network layer protocol that provides multi-casting or broad-casting may be used.

In cases where layer 218 provides multi-casting functionality, such as IP-multicasting, each receiver device may be configured to receive data from a sending devices' multicast transmission, such that the default logical communications channel of the multi-casting protocol is a broadcast from the sending device to each and every receiving device.

According to some embodiments, the use of the Coach-Player-Communications protocol along with the layer 218 protocol may mean that no central streaming hub is required to facilitate communications. For example, IP-multicast group addressing may otherwise require group membership management in order to support a flexible arrangement of subsets of receivers into communication groups. This, in turn, may require a control protocol (to facilitate listen/don't listen states), such that at least one round-trip of latency is added to the start of each communication session. This may increase system complexity.

In contrast, the use of a Coach-Player-Communications protocol along with layer 218 as generally described herein may mean that a more complex or latent control protocol can be avoided.

Layer 220 represents a media access control and/or physical layer protocol. According to some embodiments, a WiFi protocol, such as from the IEEE 802.11 family, may be used to implement a wireless local area network over which the data from the layer 218 protocol may be communicated. According to other embodiments, other media access control and/or physical layer protocols may be used in order to implement a local area network.

Figure 2B:
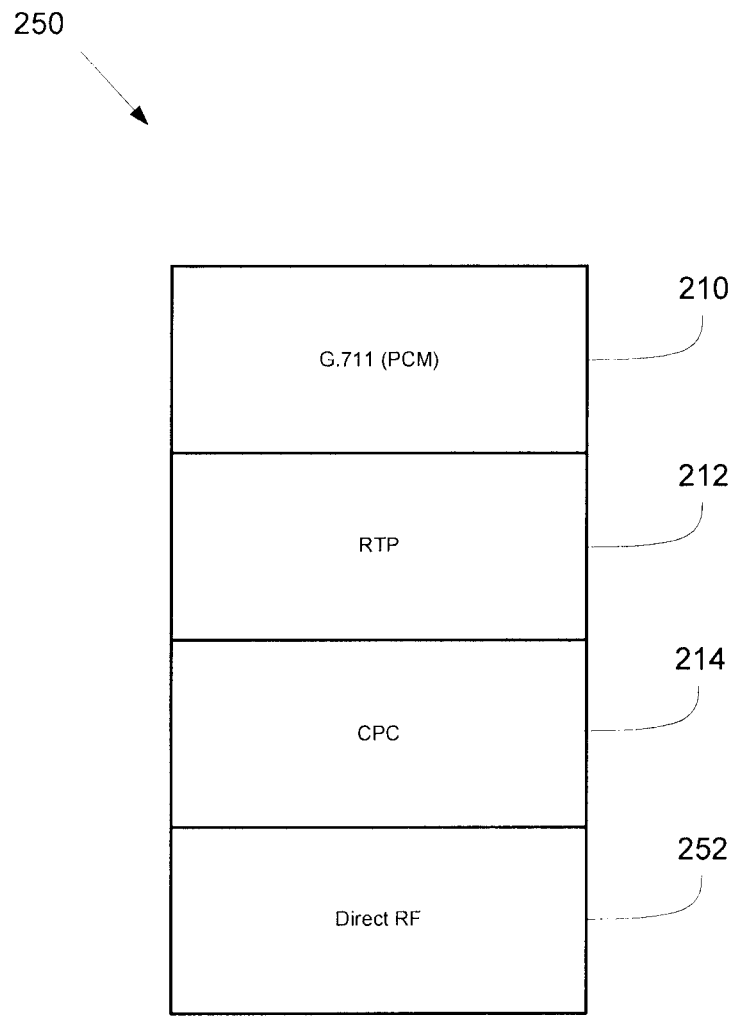
FIG. 2b is a diagram of a network protocol stack that may be used on a communications network according to some embodiments.

Referring now to FIG. 2b, illustrated therein is a communications protocol stack 250 according to some embodiments. The communications protocol stack of FIG. 2b is another example of a communications protocol stack, shown in contrast to the communications protocol stack 200 of FIG. 2a, for the sake of illustration. Other protocols may be substituted using standardized or proprietary schemes.

Layers 210 through 214 may be implemented as was previously described for the communications protocol stack 200 of FIG. 2a. Layer 214 generally represents the Coach-Player-Communications protocol (CPC).

Layer 252 represents direct radio-frequency (RF) communications. Using a broadcast RF channel, packets encoded with a CPC header can be created and broadcast directly from a transmitting device to a receiving device.

For example, referring again to FIG. 1, a first user 102 using a first device 104 can transmit CPC packets directly to a second user 106 using a second device 108, via an RF channel 117. In this example, the RF communications are represented by layer 252 and the RF channel 117, which replace the transport layer 216, the network layer 218 and the private local area network 116.

The direct RF communications may rely on amplitude, frequency, and/or phase modulation, and may be analog (such as AM, FM, etc.) or digital (such as FSK, PSK, QAM, OFDM, etc.).

According to some embodiments, multiple communications protocol stacks may be used in order to accomplish different tasks. For example, the RF channel 117 in FIG. 1 may be used to transmit voice communications using the communications protocol stack 250, while the private local area network 116 may be used to transmit device configuration and setup information using another protocol stack.

Examples of a transaction using a communications system can be seen in the series of figures FIG. 3a to FIG. 3c. In particular, FIG. 3a depicts the communications transaction at a first instant 300 (i.e., a first point in time). FIG. 3b depicts the communications transaction at a second instant 301 (i.e., at a second point in time), subsequent to the first instant. FIG. 3c depicts the communications transaction at a third instant 302 (i.e., at a third point in time), subsequent to the second instant.

For the sake of illustration, the example depicted in FIG. 3a to FIG. 3c can be seen as a scenario involving a coach and three players on the coach's team, who are involved in a sports practice session. Other scenarios are contemplated, beyond a scenario involving sports, and beyond scenarios involving practice sessions.

In this example, the coach is a user 310, equipped with a first device 312. The three players are users 320, 322, and 324, each equipped with their own second device 326a, 326b, and 326c respectively. The coach and players are using the systems, methods, and devices so that the coach can provide one-way, real-time audio messages (e.g., speech) to each of the players. The coach may provide an audio message to only one player, or to a group of more than one players, in a generally simultaneous manner. In the present example, the coach desires to send a real-time voice message to the first player and third player only; and not to the second player.

Each second device 326a, 326b, and 326b is programmed with an address. For the sake of simplicity, in this example, the address is composed of three bits; where the number of bits corresponding to the number of players. In particular, in this example there is one bit in the address field for each player. However, in other examples and embodiments, it may not be necessary to define the address field based on the number of users.

In this specific example, since the number of bits corresponds to the number of players, it is possible to compose a unique address for each player as well as for each unique group of players. The addresses for each player and each group of players in this example are determined according to the following table.

| | Binary address | | | Decimal | |
|---|---|---|---|---|---|
| | $a_2$ | $a_1$ | $a_0$ | address | Group members |
| Player 1 | 0 | 0 | 1 | 1 | Player 1 |
| Player 2 | 0 | 1 | 0 | 2 | Player 2 |
| Group 1 | 0 | 1 | 1 | 3 | Player 1 and Player 2 |
| Player 3 | 1 | 0 | 0 | 4 | Player 3 |
| Group 2 | 1 | 0 | 1 | 5 | Player 1 and Player 3 |
| Group 3 | 1 | 1 | 0 | 6 | Player 2 and Player 3 |
| Group 4 | 1 | 1 | 1 | 7 | Player 1, Player 2, and Player 3 |

The communications transaction may begin after the user 310 decides to send a real-time voice message to the users 320 and 324. The coach (e.g. user 310) may select the decimal address "5" in order to address the voice message to the first player and the second player.

The selection of decimal address "5" may be made through various means. For example, the user 310 may choose the decimal address "5" using a manual input such as a keypad, button, touch screen, dial, etc. According to some embodiments, the user 310 may choose the decimal address "5" through a voice command. According to some embodiments, the first device may be programmed to automatically select the decimal address "5" based on time, a sequence of events, or the location of any of the users, for example by pointing the first device 312 at a particular user. Furthermore, the decimal address "5" may be represented through a symbol or word.

Once the decimal address "5" has been selected on the first device 312, in the example, the user 310 may provide the voice message to the users 320 and 324. According to some embodiments, this may include speaking into a microphone that is connected to the first device. The voice signal captured from the microphone may be encoded to produce an encoded sound. The encoded sound may then be packetized, for example, using a real-time streaming media protocol. In this way, a voice message from the user 310 may be included as a part of a data packet.

In the example depicted, the data packet that includes the encoded sound (and therefore the voice message) may be used as a data packet payload and combined with an address in order to produce an addressed data packet.

In the example of FIG. 3a, a data packet payload 316 is shown as "$d_n \ldots d_2 d_1 d_0$" to suggest that the data packet payload may be composed of data bits "d" numbered 0 through n. The number of bits (e.g. "n") in the data packet payload 316 may vary; and the data packet payload 316 may be of a predetermined length or variable length, depending on various other protocols that may be used by the systems, methods, and devices.

In FIG. 3a, the user 310, equipped with a first device 312, transmits the addressed data packet 314. The addressed data packet 314 includes the data packet payload 316 as well as an address bitmask 318.

The addressed data packet 314 is transmitted from the first device 312 to a router 328 or other suitable networking device. In the example, the router 328 is configured to provide multi-casting or broadcasting of the addressed data packet 314. This may be accomplished, for example, using Internet Protocol multicasting (IP multicasting).

In FIG. 3b, the router 328 transmits the addressed data packet 314 to the three second devices 326. This has the effect of transmitting copies of the addressed data packet 314 to each and every second device 326a, 326b, and 326c, since the router 328 is using a multicasting or broadcasting scheme.

In this example, the multicasting scheme can be configured to transmit every packet to each and every device (e.g. second devices 326a, 326b, and 326c) on the network that includes the router 328. In other words, each packet is effectively broadcast to every device. Management of unique sub-group addressing may not be required from the multicasting protocol, since the addressed data packet 314 includes the address bitmask 318. In other words, the network that includes router 328 is not required to consider unique addressing at the multi-cast level, since the address bitmask 318 provides its own unique address with respect to each second device 326a, 326b, and 326c. It is sufficient that the multi-casting scheme ensures that each addressed data packet 314 is transmitted to and received by each and every device on the network that contains the router 328.

In FIG. 3c, each second device 326a, 326b, or 326c has received its own copy of the addressed data packet 314. After receiving an addressed data packet 314, a bitmask test is performed on each second device. In this example, the bitmask test includes a comparison, or logical "AND" of the programmed address of the second device and the address bitmask 318 of the received addressed data packet 314. If the result of this comparison is zero ("000"), then the bitmask test is considered to have "failed". Otherwise, if the result of the comparison is not zero, then the bitmask test is considered to have "passed".

An example of the bitmask test can be seen by looking at the second device 326a corresponding to the first player 320. In this example, the second device 326a has been programmed with an address of "001". The address bitmask 318 of the addressed data packet 314 is "101". A comparison of the address "001" and the address bitmask "101" yields a result of "001". Since the result is "001", the bitmask test is considered to have passed.

Another example of the bitmask test can be seen by looking at the second device 326b corresponding to the first player 322. In this example, the second device 326b has been programmed with an address of "010". The address bitmask 318 is "101". A comparison of the address "010" and the address bitmask "101" yields a result of "000". Since the result is "000", the bitmask test is considered to have failed.

When a bitmask test is passed, as is shown for second device 326a in FIG. 3c, the second device continues to process the addressed data packet 314. For example, this processing may first include removing the address bitmask 318 from the addressed data packet 314, so that only the data packet payload 316 remains for further processing. The data packet payload 316 may be further processed according to the protocol or scheme pertaining to the data packet payload 316.

When a bitmask test is failed, as shown for second device 326b in FIG. 3c, the second device discards the addressed data packet 314.

In the above example, the coach is able to send a specific message, such as a voice message, to the first player 320 and the third player 324 exclusively. The second player 322 does not receive the message.

Figure 4:
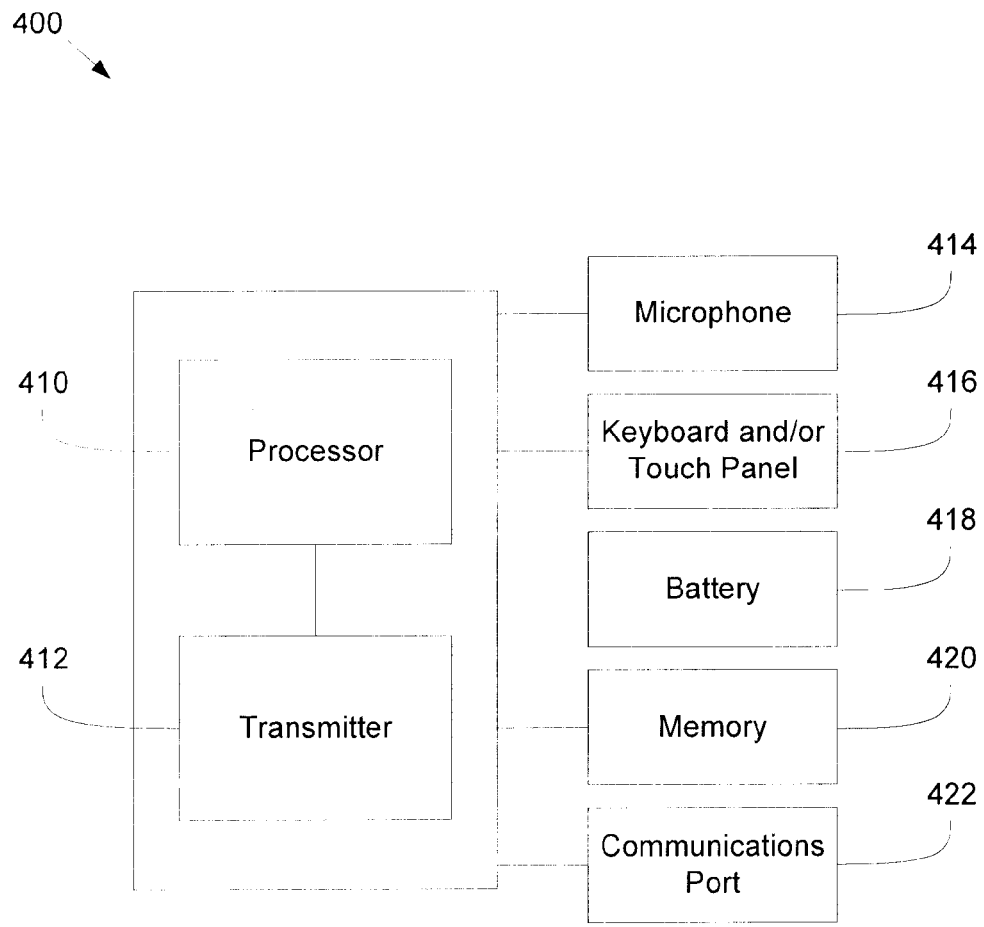
FIG. 4 is a schematic diagram of a first device according to some embodiments.

Referring now to FIG. 4, shown therein is an embodiment of a first device 400. The first device can be used for transmitting data packets.

The first device 400 includes a processor 410 and a transmitter 412. The processor is configured to compose an addressing bitmask, and then address a data packet with the bitmask.

Once the data packet has been addressed with the bitmask, the addressed data packet is transmitted using the transmitter.

The first device 400 may also include other components and devices. For example, the first device 400 may include a microphone 414, a keyboard (or other input device) 416, a battery 418, memory 420, and a communications port 422.

In some examples, a microphone 414 may be included in order for a sound, such as a voice, to be captured. For example, a microphone 414 may capture the voice of a person using the first device 400, so that vocal messages, instructions, etc., can be transmitted using the first device 400.

A keyboard 416, and/or other input device, such as a touch panel, may be included in first device 400 in order to provide a user interface to the first device 400. The keyboard 416 may be integrated into the first device 400; or the keyboard 416 may be a peripheral device connected to the first device 400.

A battery 418 may be included in the first device 400, in order to increase the mobility use of the first device 400. The battery 418 may be integrated into the first device 400; or the battery 418 may be an external battery connected to the first device.

A memory 420, or multiple memories 420 or other data storage devices, may be included in the first device 400. Here, the term "memory" may be construed loosely to include any and all forms of computer memory. The first device 400 may include, as memory 420, volatile memory, such as random-access memory (RAM), and non-volatile memory, such as a hard-disk drive. According to some embodiments, memory 420 may be a non-volatile, solid-state flash memory device. In some cases, a Secure Digital (SD) card may be used as one instance of memory 420.

The memory 420 may generally be used to store data files, data bases, program files, operating files, scripts, and other forms of digital information. The memory 420 (or memories, as the case may be) may be integrated into the first device 400; or the memory 420 (or memories, as the case may be) may be peripheral or external to the first device 400.

In some cases, at least one communications port 422 may be included in the first device 400, in order to provide connectivity to other components or devices. For example, the first device 400 may include a communications port 422 for providing wireless communications (such as Bluetooth), and/or a communications port 422 for providing optical communications, and/or a communications port 422 for serial or parallel digital communications, and/or a communications port 422 for providing an audio connection.

According to some embodiments, any of these components or devices may be included in first device 400. In other embodiments, any of these components or devices may be used as peripheral or ancillary components or devices to first device 400.

In some examples, the microphone 414 may be a discrete, stand-alone microphone, or a microphone that is included in a separate device. For example, a headset that includes a microphone may be used with the first device 400. The headset may be connected to the first 400, for example, using a wireless connection such as Bluetooth, or other wireless connection; or through a wired connection. A headset or other device that includes a microphone 414 may connect to the first device 400 using the communications port 422.

In some examples, the first device 400 may not include a microphone 414. In such a case, it is possible to transmit other sounds or data files using the first device 400. For example a pre-recorded sound file may be stored, such as on the memory 420. A user may use the keyboard 416 in order to select and/or transmit a pre-recorded sound.

It is also possible to transmit pre-recorded sounds based, for example, according to a script or programmed computer sequence. Transmitting a sequence of pre-recorded sounds may be useful in certain situations such as, but not limited to, drills and training exercises, and choreographed scenarios.

According to some embodiments, the first device 400 may include a tablet computing device, a smart phone, a laptop computer, or any other portable or mobile computing system. In other embodiments, the first device 400 may not be portable or mobile.

According to some embodiments, the transmitter 412 may comprise a direct RF transmitter in order to provide direct communications between the first device 104 and the second device 108 over the RF channel 117. In such a case, certain functions, such as the management of the private local area network 116, and/or the set-up and configuration of devices 104 and 108 may be performed by the base station 122.

According to some embodiments, the transmitter 412 may comprise a direct RF transmitter or other wireless transmitter such as Bluetooth or WiFi, in order to provide direct communications between the first device 104 and the base station 122 (e.g. carrying voice message information). In such an embodiment, the base station 122 may relay the information to the second device 108 using the local area network 116.

Figure 5:
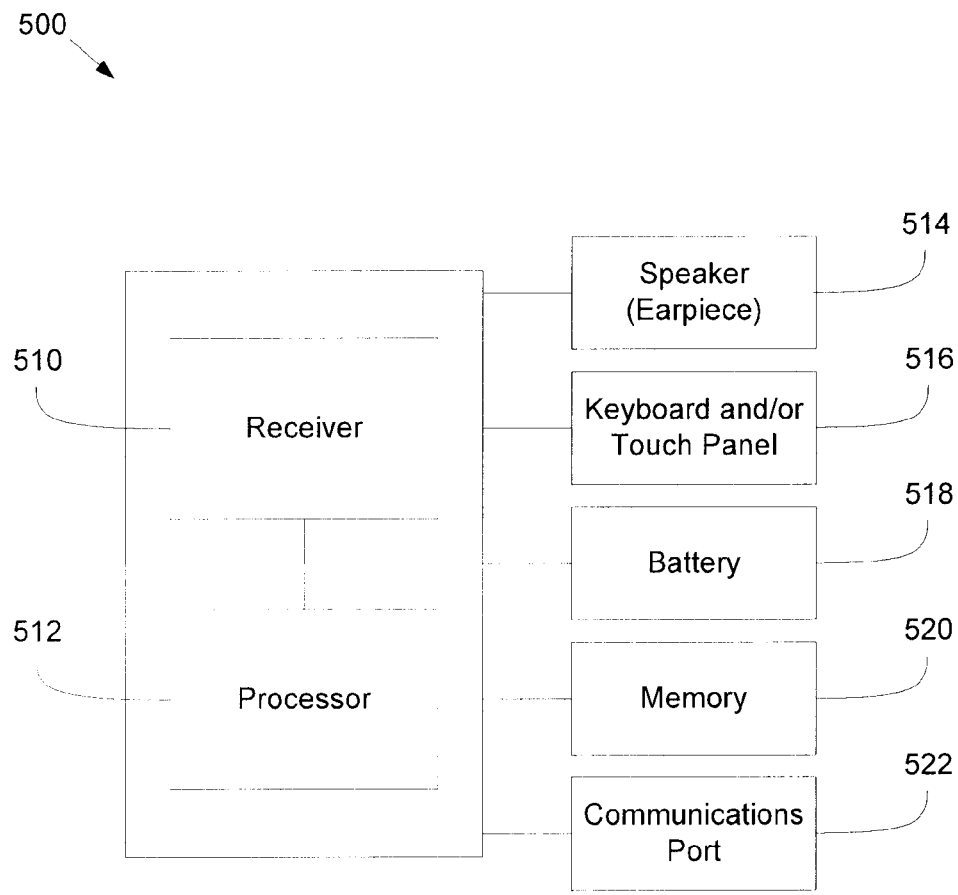
FIG. 5 is a schematic diagram of a second device according to some embodiments.

Referring now to FIG. 5, shown therein is an embodiment of a second device 500. The second device 500 can generally be used for receiving data packets from the first device 400. As shown, the second device 500 includes a receiver 510 and a processor 512. The processor 512 may be configured to perform a bitmask test on a bitmask contained in an addressed data packet in order to determine whether a received packet should be discarded, or subject to further processing. For example, a bitmask test may be executed, such that an addressed data packet is discarded if the test is not successful, for example, as previously described.

The second device 500 may also include other components and devices. For example, the second device 500 may include a speaker 514, a keyboard (or other input device) 516, a battery 518, memory 520, and at least one communications port 522.

In some examples, a speaker 514 may be included in order to output a sound, such as a voice. For example, a speaker 514 may output the voice of a person using the first device 500, so that vocal messages, instructions, etc., can be received using the second device 500.

A keyboard 516, and/or other input device, such as a touch panel, may be included in second device 500 in order to provide a user interface to the second device 500. The keyboard 516 may be integrated into the second device 500; or the keyboard 516 may be a peripheral device connected to the first device 500.

A battery 518 may be included in the second device 500, in order to increase the mobility use of the second device 500. The battery 518 may be integrated into the second device 500; or the battery 518 may be an external battery connected to the second device 500.

A memory 520, or multiple memories 520, may be included in the second device 500. Here, the term "memory" may be construed loosely to include any and all forms of computer memory. The second device 500 may include, as memory 520, volatile memory, such as random-access memory (RAM), and non-volatile memory, such as a hard-disk drive.

The memory 520 may be used to store data files, data bases, program files, operating files, scripts, and other forms of digital information. The memory 520 (or memories, as the case may be) may be integrated into the first device 500; or the memory 520 (or memories, as the case may be) may be peripheral or external to the first device 500.

At least one communications port 522 may be included in the second device 500, in order to provide connectivity to other components or devices. For example, the second device 500 may include a communications port 522 for providing wireless communications (such as Bluetooth), and/or a communications port 522 for providing optical communications, and/or a communications port 522 for serial or parallel digital communications, and/or a communications port 522 for providing an audio connection.

According to some embodiments, any of these components or devices may be included in second device 500. In other embodiments, any of these components or devices may be used as peripheral or ancillary components or devices to second device 500.

In some examples, the speaker 514 may be a discrete, stand-alone speaker, or a speaker that is included in a separate device. For example, an earpiece that includes a speaker 514 may be used with the second device 500. The earpiece may be connected to the second device 500, for example, using a wireless connection such as Bluetooth, or other wireless connection; or through a wired connection. An earpiece or other device that includes a speaker 514 may connect to the second device 500 using the communications port 522.

In some examples, the second device 500 may not include a speaker 514. In such a case, it is possible to transmit data that represents signals other than sound using the first device 400. For example the first device 400 may transmit data corresponding to visual cue signals. The visual cues may then be displayed on the second device 500 or on another device, for example via a display (not shown).

According to some embodiments, the second device 500 may include a tablet computing device, a smart phone, a laptop computer, or any other portable or mobile computing system. In other embodiments, the second device 500 may not be portable or mobile.

According to some embodiments, the receiver 510 may comprise a direct RF receiver in order to received direct communications between the first device 104 and the second device 108 over the RF channel 117.

Figure 6A:
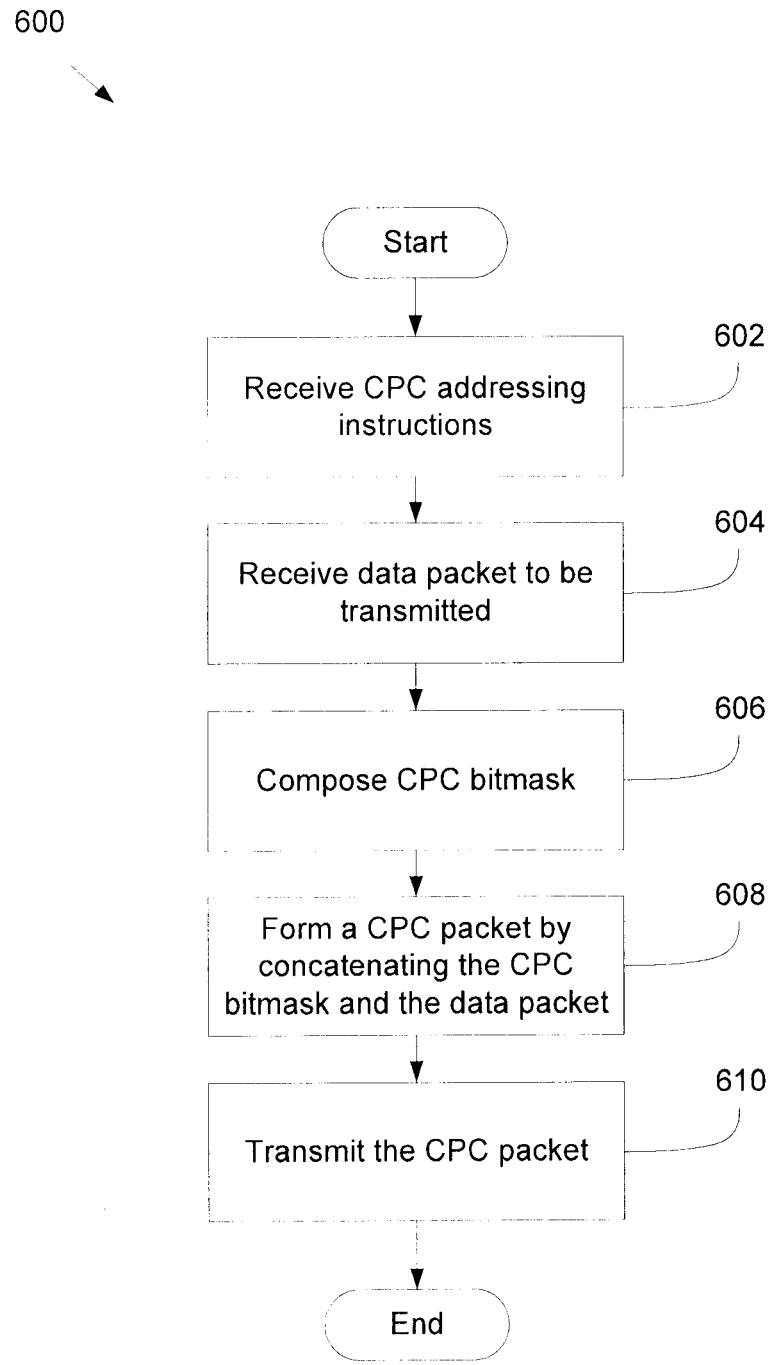
FIG. 6a is a flow diagram of a method of preparing and sending a data packet, according to some embodiments.

A method 600 for transmitting an addressed data packet is shown in FIG. 6a. The method 600 may be executed, for example, on a first device, such as the embodiment shown in FIG. 4

At step 602, instructions for addressing a data packet are received. According to some embodiments, this may include receiving an address that complies with a Coach-Player-Communications protocol. For example, a user may determine a Coach-Player-Communications protocol address to use with a data packet.

At step 604, a data packet to be transmitted is received. According to some embodiments, this data packet may contain encoded sound data derived from a voice message.

At step 606, an addressing bitmask is composed. For example, the addressing bitmask may be composed according to the instructions received at step 602.

At step 608, the data packet is addressed with the bitmask that was composed in step 606. For example, this may include concatenating the data packet with the addressing bitmask.

At step 610, the addressed data packet is transmitted.

Figure 6B:
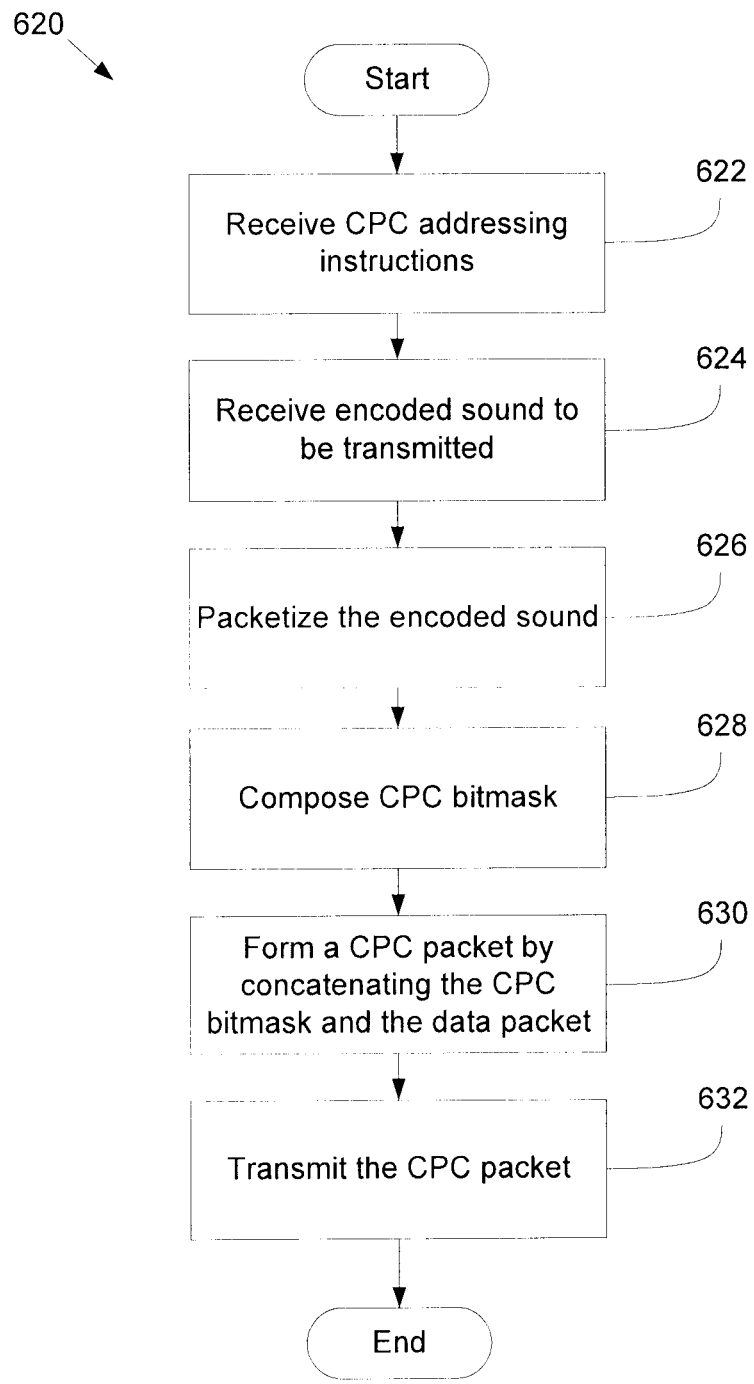
FIG. 6b is a flow diagram of a method of preparing and sending a data packet according to some embodiments.

A method 620 for transmitting an addressed data packet is shown in FIG. 6b. The method 620 may be executed, for example, by a first device, such as the embodiment shown in FIG. 4

At step 622, instructions for addressing a data packet are received. According to some embodiments, this may include receiving an address that complies with a Coach-Player-Communications protocol. For example, a user may determine a Coach-Player-Communications protocol address to use with a data packet.

At step 624, an encoded sound to be transmitted is received.

At step 626, a data packet is formed by packetizing the encoded sound. For example, the data packet may be formed according to the Real-time Transport Protocol (RTP).

At step 628, an addressing bitmask is composed. For example, the addressing bitmask may be composed according to the instructions received at step 622.

At step 630, the data packet is addressed with the bitmask that was composed in step 628. For example, this may include concatenating the data packet with the addressing bitmask.

At step 632, the addressed data packet is transmitted.

Figure 6C:
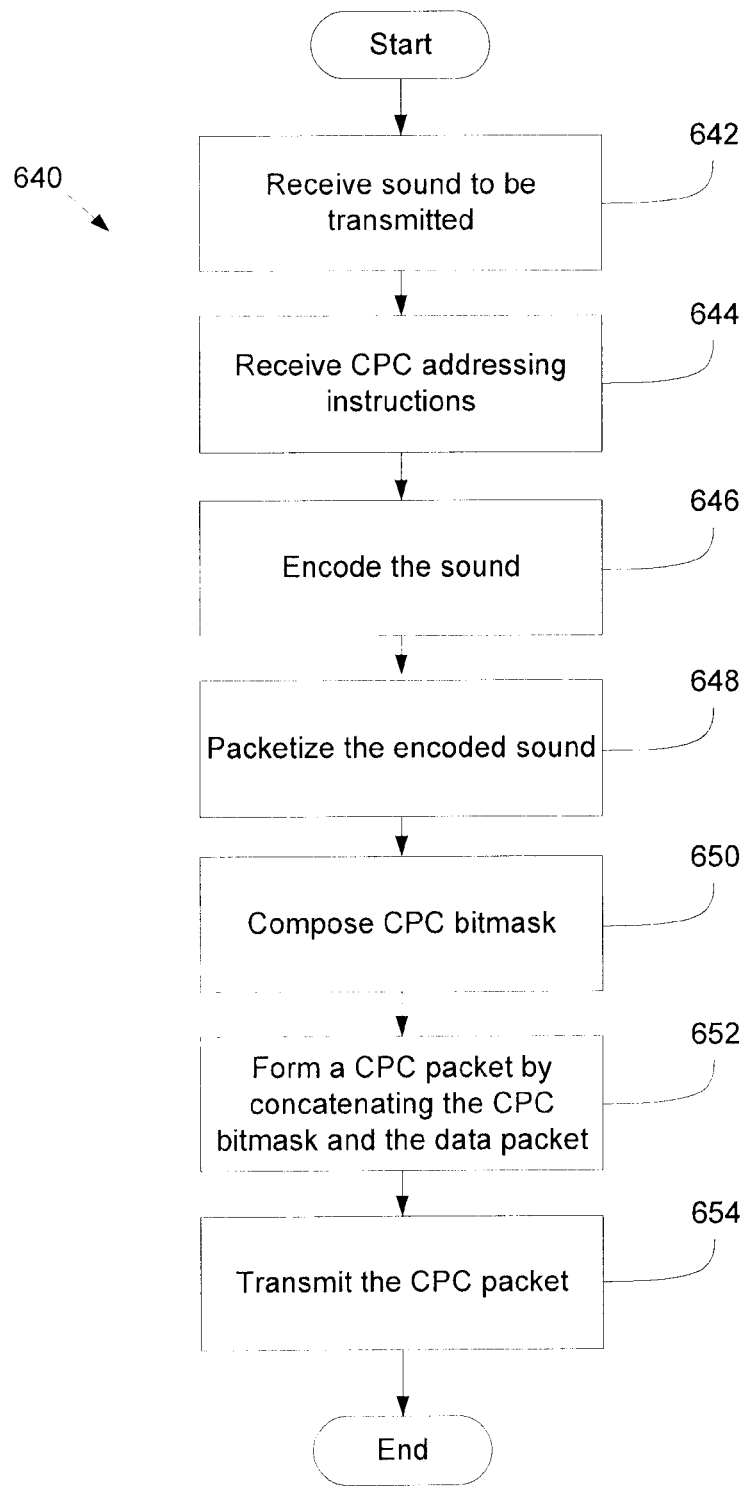
FIG. 6c is a flow diagram of a method of preparing and sending a data packet according to some embodiments.

A method 640 for transmitting an addressed data packet is shown in FIG. 6c. The method 640 may be executed, for example, by a first device, such as the embodiment shown in FIG. 4

At step 642, an encoded sound to be transmitted is received. In comparison to methods 600 and 620, it may be possible to receive addressing instructions at step 644 prior to receiving the sound to be transmitted at step 642. Similarly, steps 602 and 604 of method 600, and steps 622 and 624 of method 620 may be performed out of order as presented in the figures.

At step 644, instructions for addressing a data packet are received. According to some embodiments, this may include receiving an address that complies with a Coach-Player- Communications protocol. For example, a user may determine a Coach-Player-Communications protocol address to use with a data packet.

At step 646, the sound received at step 642 is encoded. For example, the sound may be encoded according to ITU G.711, or pulse-code modulation (PCM).

At step 648, a data packet is formed by packetizing the encoded sound. For example, the data packet may be formed according to the Real-time Transport Protocol (RTP).

At step 650, an addressing bitmask is composed. For example, the addressing bitmask may be composed according to the instructions received at step 644.

At step 652, the data packet is addressed with the bitmask that was composed in step 650. For example, this may include concatenating the data packet with the addressing bitmask.

At step 654, the addressed data packet is transmitted.

Figure 6D:
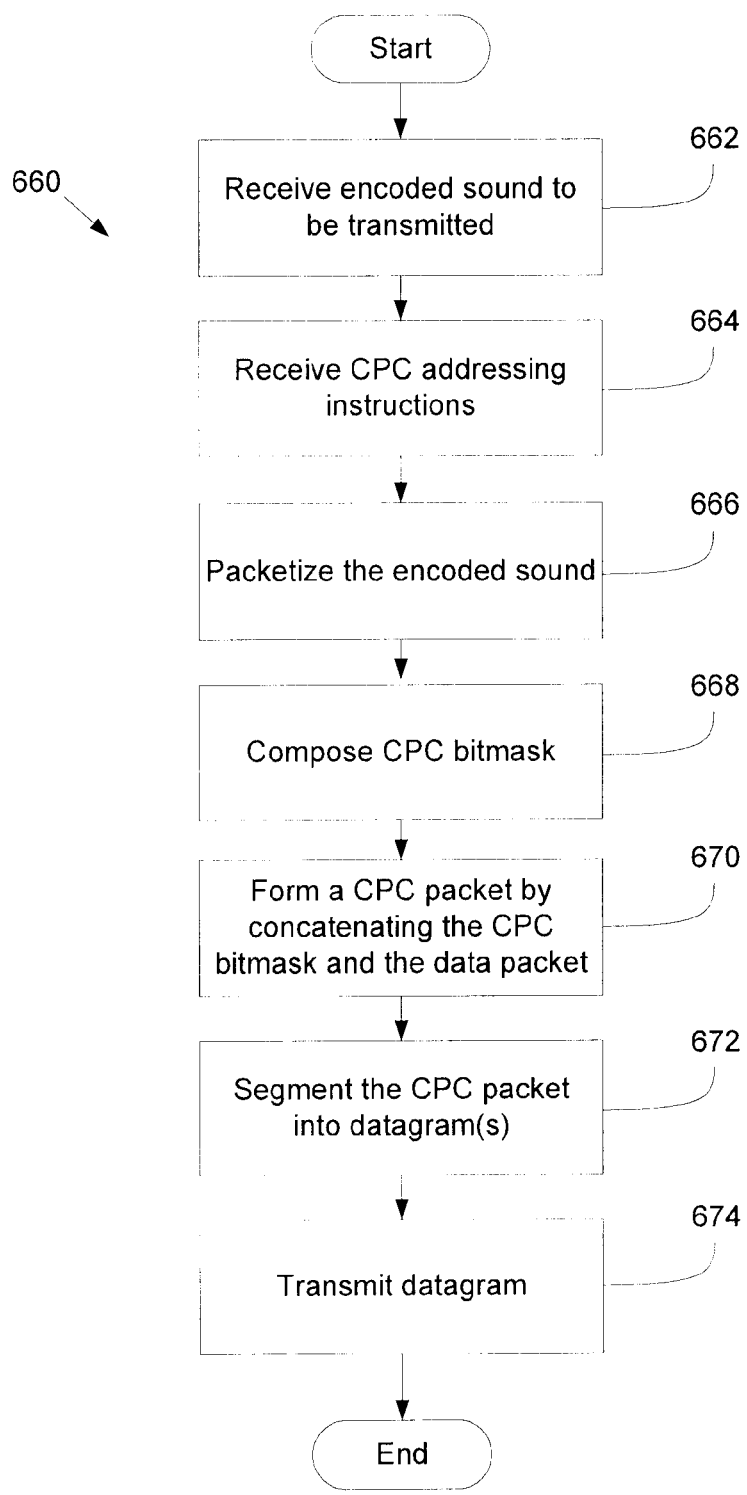
FIG. 6d is a flow diagram of a method of preparing and sending a data packet according to some embodiments.

A method 660 for transmitting a datagram is shown in FIG. 6d. The method 660 may be executed, for example, by a first device, such as the embodiment shown in FIG. 4

At step 662, an encoded sound to be transmitted is received.

At step 664, instructions for addressing a data packet are received. According to some embodiments, this may include receiving an address that complies with a Coach-Player-Communications protocol. For example, a user may determine a Coach-Player-Communications protocol address to use with a data packet.

At step 666, a data packet is formed by packetizing the encoded sound. For example, the data packet may be formed according to the Real-time Transport Protocol (RTP).

At step 668, an addressing bitmask is composed. For example, the addressing bitmask may be composed according to the instructions received at step 664.

At step 670, the data packet is addressed with the bitmask that was composed in step 668. For example, this may include concatenating the data packet with the addressing bitmask.

At step 672, the addressed data packet is formed into at least one datagram. According to some embodiments, the datagrams may be formed according to the User Datagram Protocol (UDP).

At step 674, the addressed data packet is transmitted.

Figure 6E:
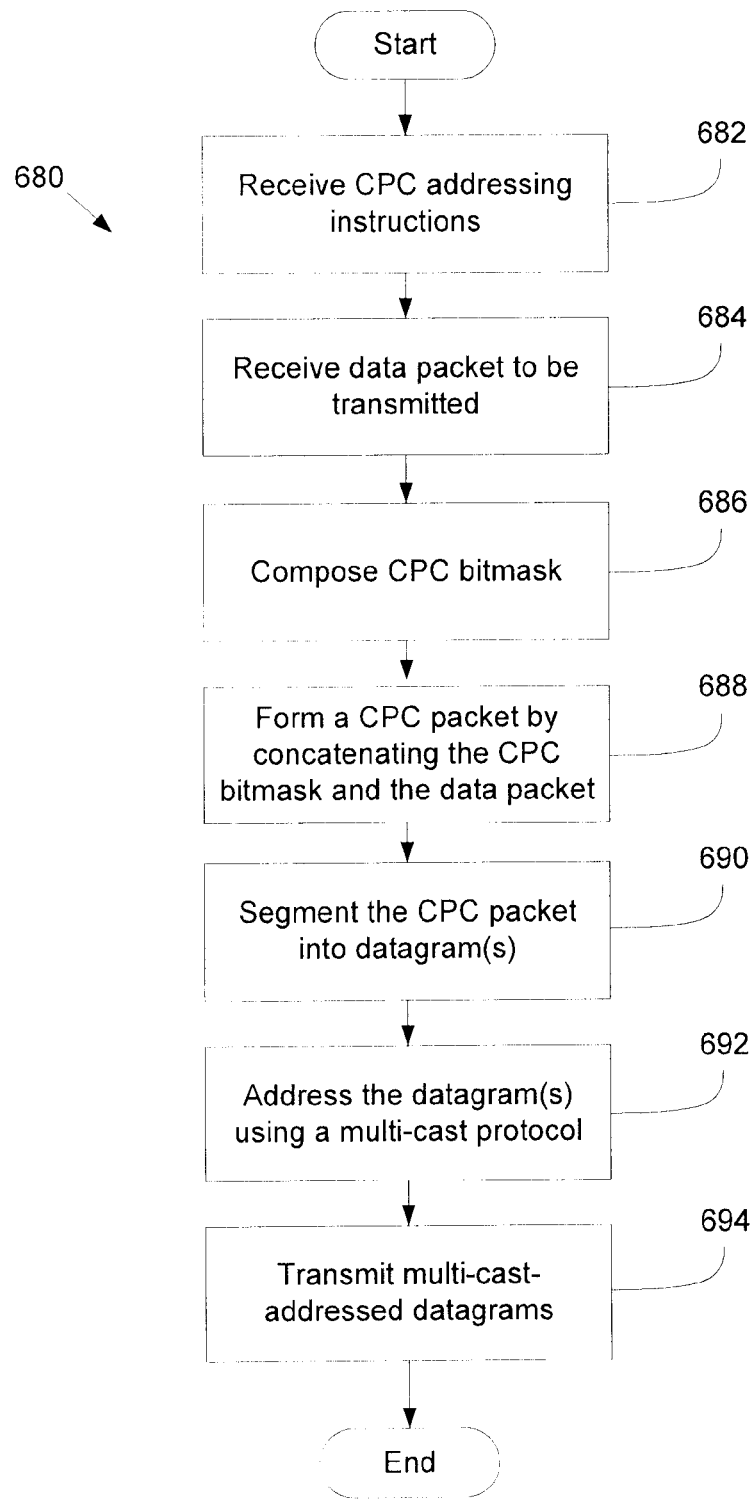
FIG. 6e is a flow diagram of a method of preparing and sending a data packet according to some embodiments.

A method 680 for multicasting a datagram is shown in FIG. 6e. The method 680 may be executed, for example, by a first device, such as the embodiment shown in FIG. 4

At step 682, instructions for addressing a data packet are received. According to some embodiments, this may include receiving an address that complies with a Coach-Player-Communications protocol. For example, a user may determine a Coach-Player-Communications protocol address to use with a data packet.

At step 684, a data packet to be transmitted is received. According to some embodiments, this data packet may contain encoded sound data derived from a voice message.

At step 686, an addressing bitmask is composed. For example, the addressing bitmask may be composed according to the instructions received at step 682.

At step 688, the data packet is addressed with the bitmask that was composed in step 686. For example, this may include concatenating the data packet with the addressing bitmask.

At step 690, the addressed data packet is formed into at least one datagram. According to some embodiments, the datagrams may be formed according to the User Datagram Protocol (UDP).

At step 692, the at least one datagram may be addressed using a multicast or broadcast protocol. According to some embodiments, the multicast or broadcast protocol may be used in such a way as to ensure that each and every datagram is sent to each and every receiver. According to some embodiments, IP-multicast may be used as the multicast protocol.

At step 694, the datagram is transmitted using a multicasting or broadcasting scheme. According to some embodiments, the datagram may be transmitted using a WiFi protocol such as a protocol from the IEEE 802.11 family.

Figure 7A:
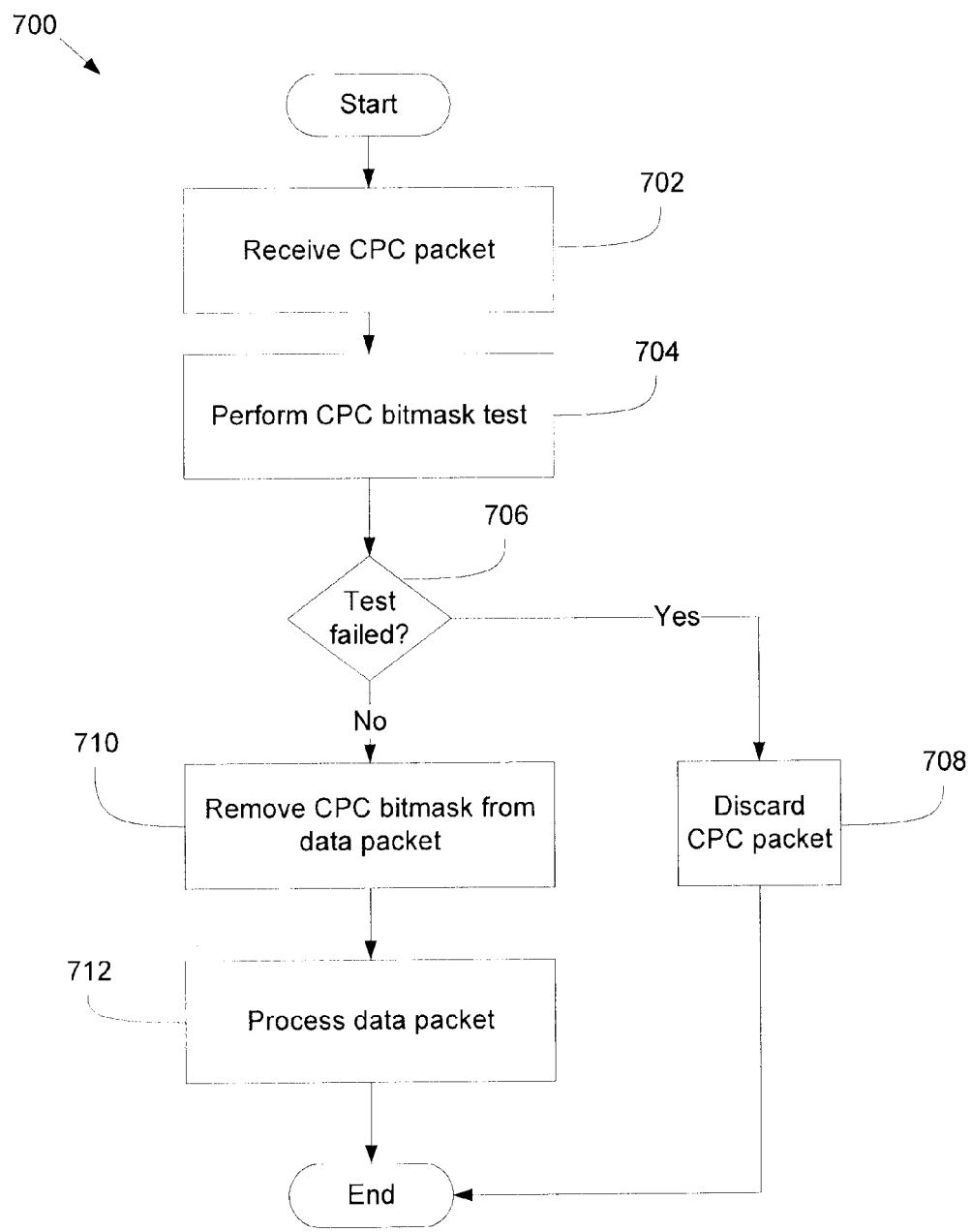
FIG. 7a is a flow diagram of a method of receiving and analysing a data packet according to some embodiments.

A method 700 for receiving, analyzing, and processing an addressed data packet is shown in FIG. 7a. The method 700 may be executed, for example, by a second device, such as the embodiment shown in FIG. 5.

At step 702, an addressed data packet is received. According to some embodiments, the addressed data packet may contain encoded sound data derived from a voice message.

At step 704, a bitmask test is performed on the addressed data packet. According to some embodiments, the bitmask test may include comparing the address bitmask of the addressed data packet to a programmed address on the receiving device. The bitmask test is performed such that, if the bitmask test is failed at step 706, then, at step 708, the data packet is discarded.

If, at step 706, the bitmask test is passed, then the method proceeds to step 710.

At step 710, the data packet or data packet payload is recovered from the addressed data packet. According to some embodiments, this may include removing the address bitmask from the addressed data packet.

At step 712, the data packet may be subject to further processing, for example, to recover the encoded sound data and/or the original voice message contained in the data packet.

Figure 7B:
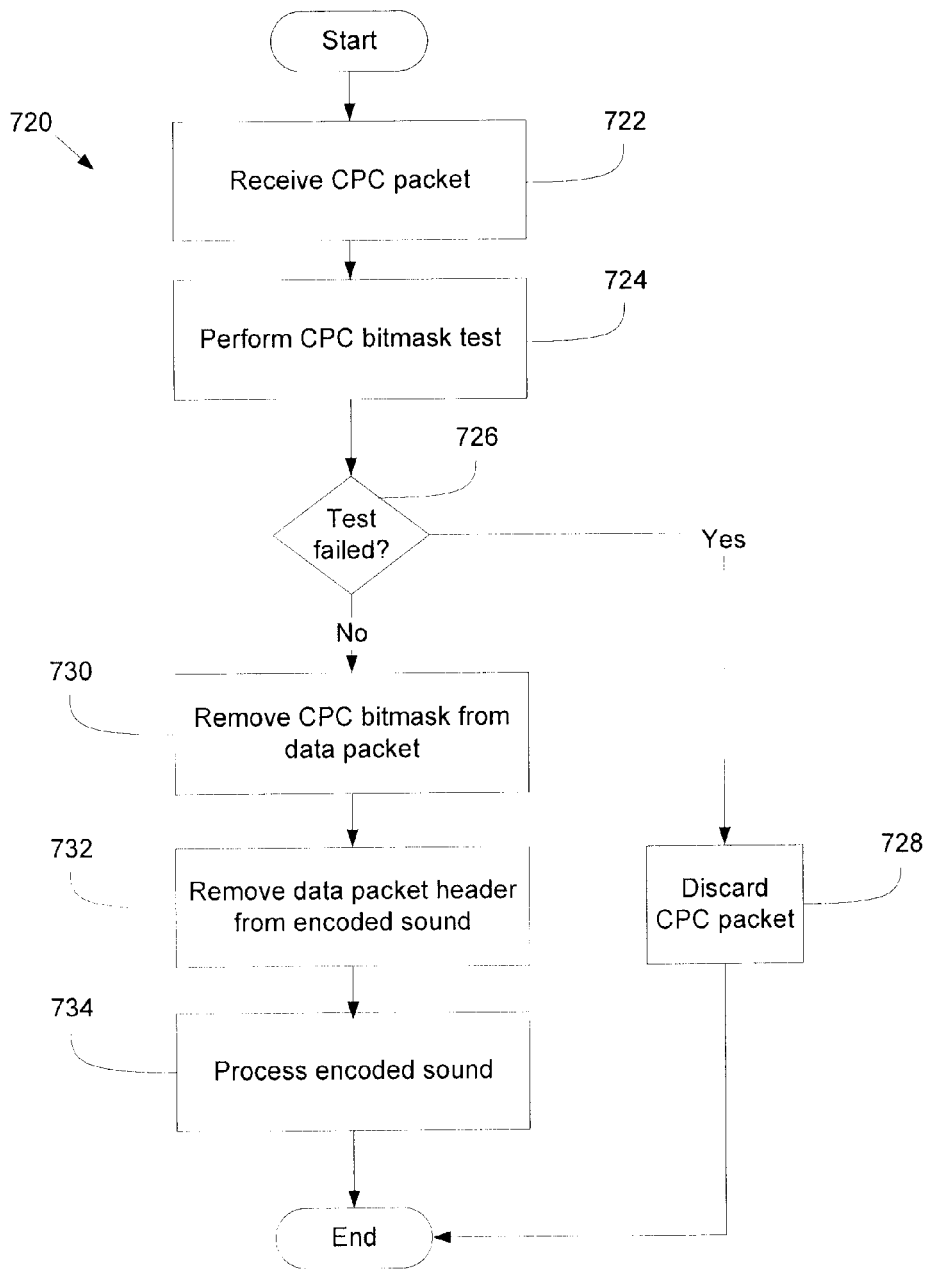
FIG. 7b is a flow diagram of a method of receiving and analysing a data packet according to some embodiments.

A method 720 for receiving, analyzing, and processing an encoded sound is shown in FIG. 7b. The method 720 may be executed, for example, by a second device, such as the embodiment shown in FIG. 5.

At step 722, an addressed data packet is received. According to some embodiments, the addressed data packet may contain encoded sound data derived from a voice message.

At step 724, a bitmask test is performed on the addressed data packet. According to some embodiments, the bitmask test may include comparing the address bitmask of the addressed data packet to a programmed address on the receiving device. The bitmask test is performed such that, if the bitmask test is failed at step 726, then, at step 728, the data packet is discarded.

If, at step 726, the bitmask test is passed, then the method proceeds to step 730.

At step 730, the data packet or data packet payload is recovered from the addressed data packet. According to some embodiments, this may include removing the address bitmask from the addressed data packet.

At step 732, the data packet may be subject to further processing. For example, the encoded sound may be recovered from the data packet. According to some embodiments, this may include removing a data packet header from the encoded sound.

At step 734, the encoded sound may be subject to further processing, for example, to recover the sound signal of the original voice message.

Figure 7C:
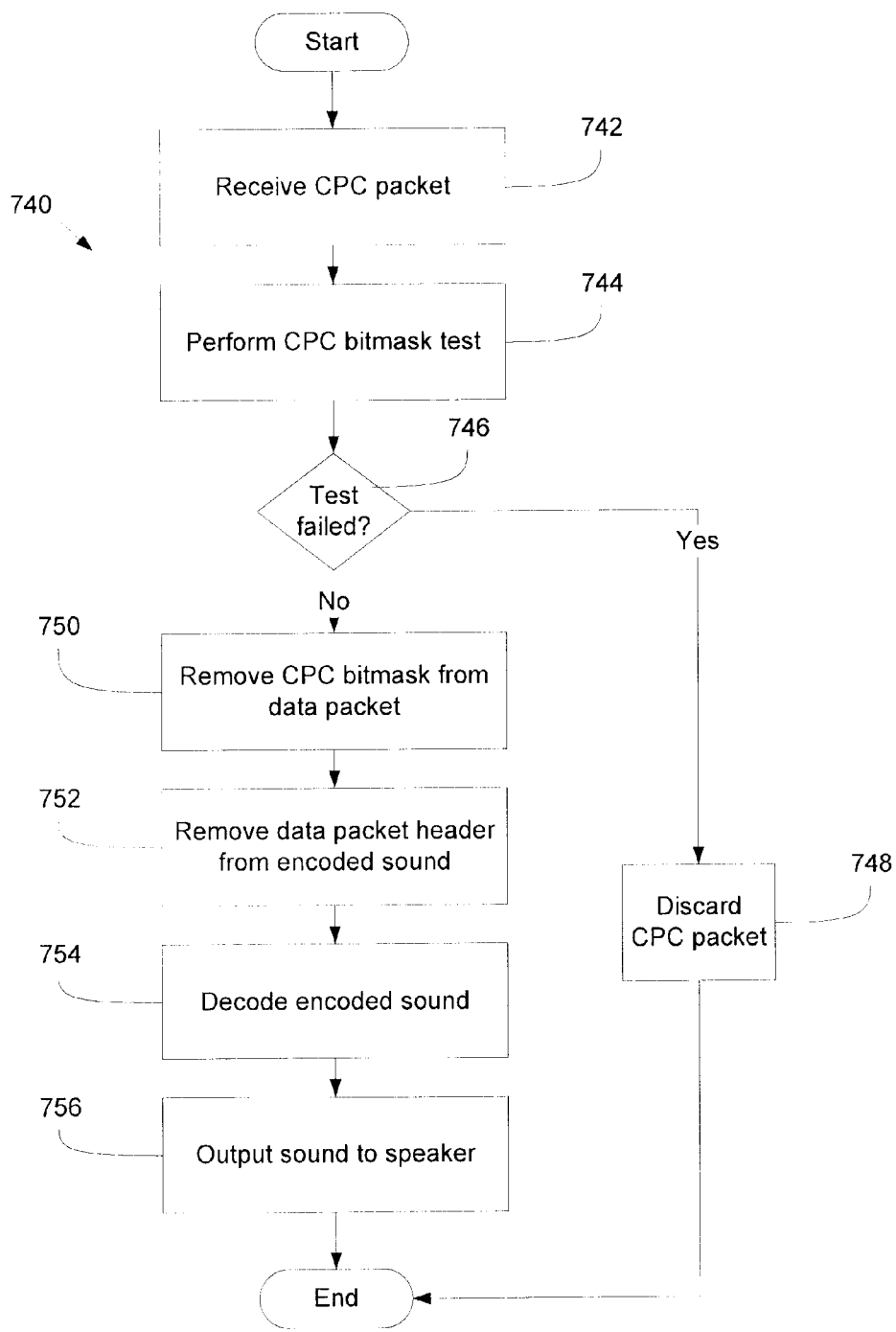
FIG. 7c is a flow diagram of a method of receiving and analysing a data packet according to some embodiments.

A method 740 for receiving, analyzing, and processing a sound is shown in FIG. 7c. The method 740 may be executed, for example, by a second device, such as the embodiment shown in FIG. 5.

At step 742, an addressed data packet is received. According to some embodiments, the addressed data packet may contain encoded sound data derived from a voice message.

At step 744, a bitmask test is performed on the addressed data packet. According to some embodiments, the bitmask test may include comparing the address bitmask of the addressed data packet to a programmed address on the receiving device. The bitmask test is performed such that, if the bitmask test is failed at step 746, then, at step 748, the data packet is discarded.

If, at step 746, the bitmask test is passed, then the method proceeds to step 750.

At step 750, the data packet or data packet payload is recovered from the addressed data packet. According to some embodiments, this may include removing the address bitmask from the addressed data packet.

At step 752, the encoded sound may be recovered from the data packet. According to some embodiments, this may include removing a data packet header from the encoded sound.

At step 754, the encoded sound may be decoded into an audio signal.

At step 756 the audio signal may be converted into a sound, in order to recover the original voice message. For example, this may include applying the sound signal to a speaker.

Figure 7D:
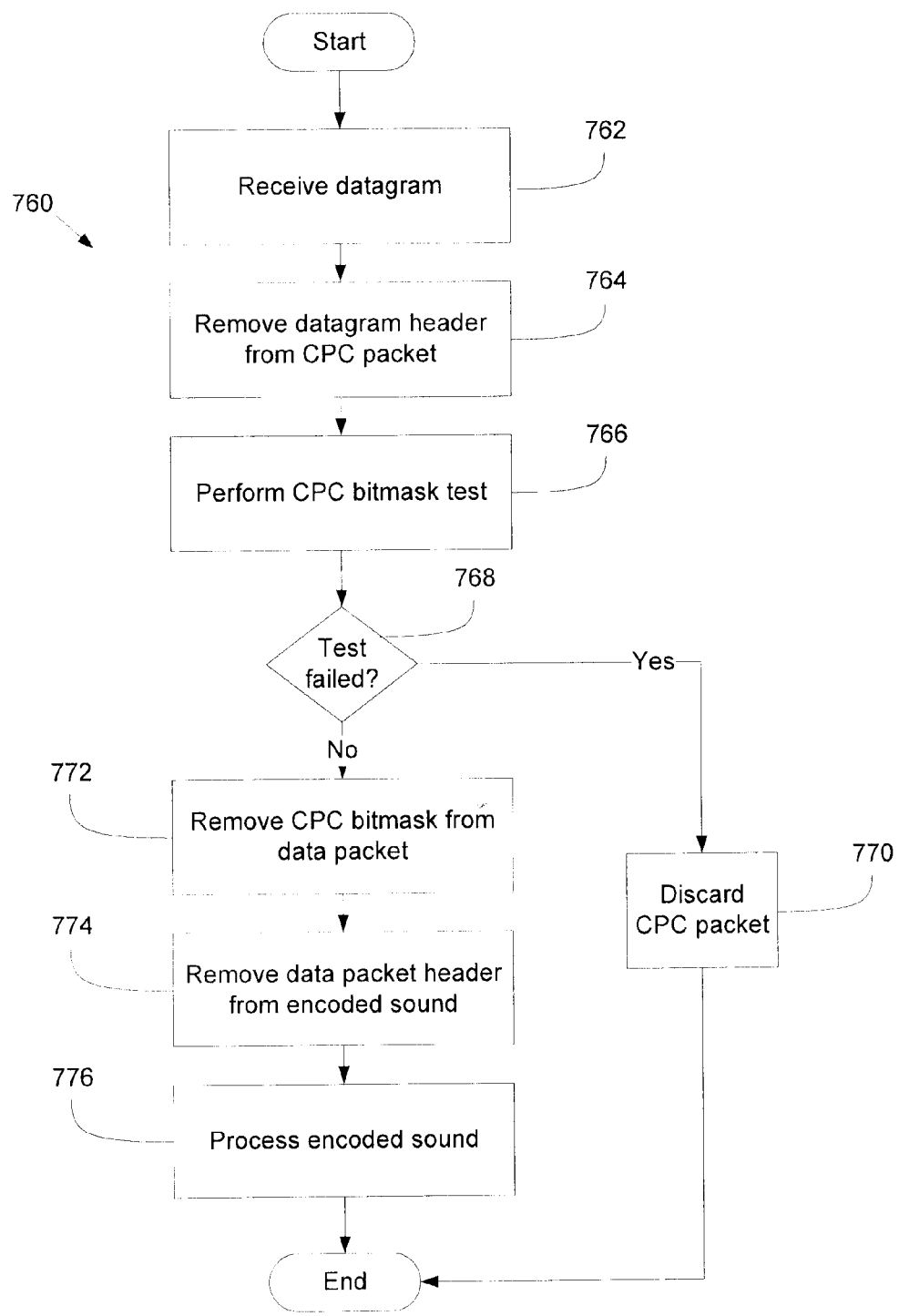
FIG. 7d is a flow diagram of a method of receiving and analysing a data packet according to some embodiments.

A method 760 for receiving, analyzing, and processing an encoded sound is shown in FIG. 7d. The method 760 may be executed, for example, by a second device, such as the embodiment shown in FIG. 5.

At step 762, a datagram is received. According to some embodiments, the datagram may contain a data packet that may contain encoded sound data derived from a voice message.

At step 764, an addressed data packet is recovered from at least one datagram.

At step 766, a bitmask test is performed on the addressed data packet. According to some embodiments, the bitmask test may include comparing the address bitmask of the addressed data packet to a programmed address on the receiving device. The bitmask test is performed such that, if the bitmask test is failed at step 768, then, at step 770, the data packet is discarded.

If, at step 768, the bitmask test is passed, then the method proceeds to step 772.

At step 772, the data packet or data packet payload is recovered from the addressed data packet. According to some embodiments, this may include removing the address bitmask from the addressed data packet.

At step 774, the encoded sound may be recovered from the data packet. According to some embodiments, this may include removing a data packet header from the encoded sound.

At step 776, the encoded sound may be subject to further processing, for example, to recover the sound signal of the original voice message.

Figure 7E:
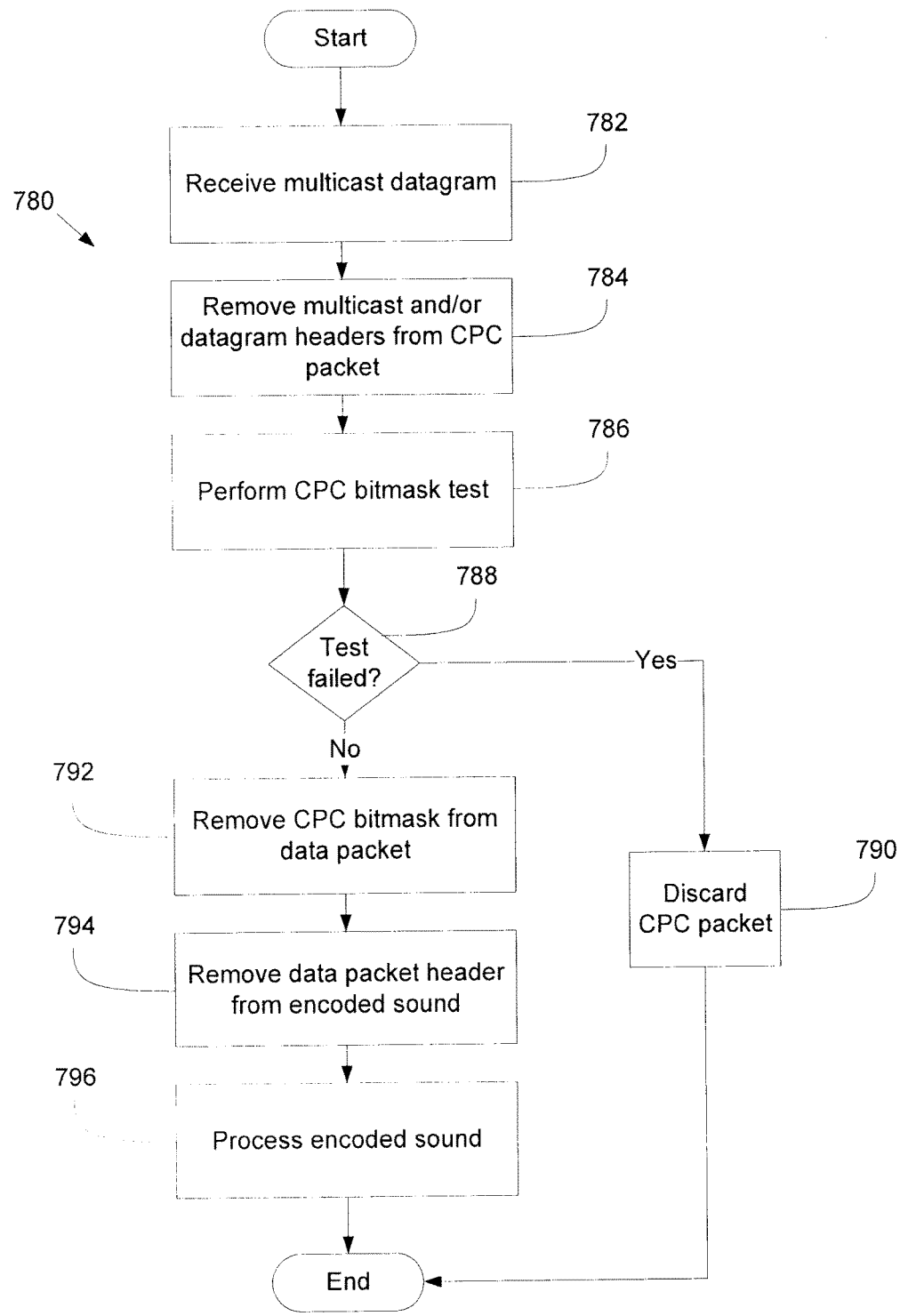
FIG. 7e is a flow diagram of a method of receiving and analysing a data packet according to another embodiment.

A method 780 for receiving, analyzing, and processing an encoded sound is shown in FIG. 7e. The method 780 may be executed, for example, by a second device, such as the embodiment shown in FIG. 5.

At step 782, a multicast datagram is received. For example, the multicast datagram may be received according to a multicasting or broadcasting protocol. Additional header data may be attached to the addressed data packet in accordance with the multicasting or broadcasting protocol. According to some embodiments, the multicast datagram may contain a data packet that may contain encoded sound data derived from a voice message.

At step 784, an addressed data packet is recovered from at least one multicast datagram. This may involve removing the multicast header data as well as other datagram header data from the addressed data packet.

At step 786, a bitmask test is performed on the addressed data packet. According to some embodiments, the bitmask test may include comparing the address bitmask of the addressed data packet to a programmed address on the receiving device. The bitmask test is performed such that, if the bitmask test is failed at step 788, then, at step 790, the data packet is discarded.

If, at step 788, the bitmask test is passed, then the method proceeds to step 792.

At step 792, the data packet or data packet payload is recovered from the addressed data packet. According to some embodiments, this may include removing the address bitmask from the addressed data packet.

At step 794, the encoded sound may be recovered from the data packet. According to some embodiments, this may include removing a data packet header from the encoded sound.

At step 796, the encoded sound may be subject to further processing, for example, to recover the sound signal of the original voice message.

While the above description provides examples of one or more apparatus, methods, or systems, it will be appreciated that other apparatus, methods, or systems may be within the scope of the claims as interpreted by one of skill in the art.

The invention claimed is:

1. A communications system for sending a data packet, comprising:
   (a) a first device, comprising:
      (i) a processor, the processor configured to compose an addressing bitmask and, address the data packet with the bitmask; and,
      (ii) a transmitter connected to the processor for transmitting the addressed data packet;
   (b) a second device, comprising:
      (i) a receiver for receiving the addressed data packet; and,
      (ii) a processor attached to the receiver, the processor configured to perform a bitmask test on the bitmask contained in the addressed data packet such that, if the test is failed, then the addressed data packet is discarded;
   wherein the data packet comprises encoded audio data, wherein the encoded audio data is encoded with pulse code modulation;
   wherein:
   (a) the processor of the first device is further configured to segment the addressed data packet into at least one datagram;
   (b) the transmitter of the first device transmits the addressed data packet as a part of the at least one datagram, the at least one datagram being transmitted using a multi-casting protocol;
   (c) the receiver of the second device receives the addressed data packet as a part of at least one datagram;
   (d) the processor of the second device is further configured to reconstitute the data packet from the at least one datagram;
   wherein: the datagrams are User Datagram Protocol (UDP) datagrams; and, the multi-casting protocol uses the Internet Protocol multi-casting (IP multicasting) protocol;

wherein at least one of the transmitter of the first device and the receiver of the second device are configured for use over a private wireless local area network; and wherein the private wireless local area network uses at least one IEEE 802.11 standard.

2. The communications system of claim 1, wherein the data packet is a Real-time Transport Protocol (RTP) packet.

3. The communications system of claim 1, wherein the encoded audio data is encoded according to ITU G.711.

4. The communications system of claim 1, wherein the transmitter of the first device is a direct RF broadcast transmitter, and the receiver of the second device is a direct RF broadcast receiver.

5. A method for communicating a data packet, comprising:
   (a) a processor in a first device performing the steps of:
      (i) composing an addressing bitmask;
      (ii) addressing the data packet with the bitmask;
   (b) a transmitter in the first device transmitting the addressed data packet;
   (c) a receiver in a second device receiving the addressed data packet;
   (d) a processor in the second device performing a bitmask test on the bitmask contained in the addressed data packet such that, if the test failed, then the addresses data packet is discarded;
   (e) wherein the data packet comprises encoded audio data,
   (f) wherein the encoded audio data is encoded with pulse code modulation;
   wherein:
   (g) the processor of the first device is further configured to segment the addressed data packet into at least one datagram;
   (h) the transmitter of the first device transmits the addressed data packet as a part of the at least one datagram, the at least one datagram being transmitted using a multi-casting protocol;
   (i) the receiver of the second device receives the addressed data packet as a part of at least one datagram;
   (j) the processor of the second device is further configured to reconstitute the data packet from the at least one datagram;
   wherein: the datagrams are User Datagram Protocol (UDP) datagrams; and, the multi-casting protocol uses the Internet Protocol multi-casting (IP multicasting) protocol;
   wherein at least one of the transmitter of the first device and the receiver of the second device are configured for use over a private wireless local area network; and
   wherein the private wireless local area network uses at least one IEEE 802.11 standard.

6. The method of claim 5, wherein the data packet is a Real-time Transport Protocol or RTP packet.

7. The method of claim 5, wherein the transmitter is a direct RF broadcast transmitter and the receiver is a direct RF broadcast receiver.

8. The method of claim 5, wherein the encoded audio data is encoded according to ITU G.711.

\* \* \* \* \*